US007664613B2

(12) United States Patent
Hansen

(10) Patent No.: US 7,664,613 B2
(45) Date of Patent: Feb. 16, 2010

(54) SYSTEM AND METHOD OF DATA HARVESTING

(75) Inventor: Neils R. Hansen, Poole (GB)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 11/695,825

(22) Filed: Apr. 3, 2007

(65) Prior Publication Data

US 2008/0249647 A1    Oct. 9, 2008

(51) Int. Cl.
*G01N 33/00*    (2006.01)

(52) U.S. Cl. .............................. 702/82; 702/81; 702/83; 702/176

(58) Field of Classification Search .................... 702/56, 702/81, 104, 181–183, 185; 704/9; 707/101; 709/217; 717/100, 101
See application file for complete search history.

(56) References Cited

U.S. PATENT DOCUMENTS

| 5,875,110 | A | * | 2/1999 | Jacobs | 700/232 |
| 5,999,908 | A | * | 12/1999 | Abelow | 705/1 |
| 6,636,862 | B2 | * | 10/2003 | Lundahl et al. | 707/101 |
| 6,718,535 | B1 | * | 4/2004 | Underwood | 717/101 |
| 2002/0073374 | A1 | | 6/2002 | Danialy | |
| 2002/0194047 | A1 | * | 12/2002 | Edinger et al. | 705/9 |
| 2005/0015666 | A1 | | 1/2005 | Kamani | |
| 2005/0222815 | A1 | * | 10/2005 | Tolly | 702/185 |
| 2006/0004475 | A1 | | 1/2006 | Brackett | |
| 2007/0021855 | A1 | | 1/2007 | Ono | |

OTHER PUBLICATIONS

Regina Colombo, Ana Guerra, The Evaluation Method for Software Product, available at www.cenpra.gov.br/publicacoes/pdf/2002/evaluation_software.pdf, 2002.
International Search Report and Written Opinion of The International Searching Authority, mailed Aug. 29, 2008 corresponding to International application No. PCT/US08/54841.

* cited by examiner

*Primary Examiner*—Eliseo Ramos Feliciano
*Assistant Examiner*—Felix E Suarez
(74) *Attorney, Agent, or Firm*—Husch Blackwell Sanders Welsh & Katz

(57) ABSTRACT

Data harvesting can be carried out relative to performance or reliability information associated with one or more groups of electrical units. Ambient condition detectors associated with a variety of industrial or commercial installations and subject to a variety of different conditions can be returned for performance and reliability testing after predetermined usage intervals. Analysis of test results can be maintained in a database. Customers can be provided multilevel access to the information in the database. Reliability and test results for a class of detectors can be provided to a number of customers that have provided samples for evaluation. Application specific information can be limited to a particular customer or customers.

20 Claims, 2 Drawing Sheets

SYSTEM AND METHOD OF DATA HARVESTING

FIELD

The invention pertains to systems and methods of harvesting data pertaining to performance and reliability of selected electrical or electro-chemical units. More particularly, the invention pertains to systems and methods for obtaining representative product samples from the field and for conducting testing and analysis of performance and reliability characteristics of those samples.

BACKGROUND

It has been recognized that reliably operating products benefit both the manufacturer and the manufacturer's customer who might be making a use of such products. In an attempt to improve product quality, various quality control schemes have been developed to attempt to design quality into respective products. For example, quality circles are a well known vehicle which has been used to promote product improvement. Alternately, the six sigma problem solving method has been widely used for the purpose of improving the quality of existing processes and products. The six sigma method which incorporates definitional, measurement, analysis improvement and control steps attempts to identify causes of quality defects and then addresses the defects and attempts to control process variables which are responsible for various defects.

While various known systems have definitely been instrumental in improving the quality of respective products, there continues to be an ongoing need for product improvement. Another aspect of quality improvement can be found in testing and analysis of the performance of existing products over at least portions of their expected life time.

From the point of view of a manufacturer wishing to improve product quality, it would be desirable to be able to systematically obtain representative samples of product from customers which have used the product for its intended purpose throughout a portion of the product's respective lifetime.

Evaluation of actual product from the field addresses known problems with laboratory testing which can be non-representative of real world performance. Additionally, testing of failed or defective product returned from the field may only identify atypical process failures as opposed to product design failures. Further, such testing may not be able to predict a mean time between failures for properly manufactured product.

Thus, it would be desirable to be able to conduct testing of a regular stream of product returned from customers where the returned product is not necessarily regarded as defective or nonperforming. Further, it would be desirable to be able to carry out testing and analysis of such product which might be received from a variety of different customers and which might have been exposed to differing operating conditions. Further, it would be desirable to be able to provide various levels of feedback to customers which were willing to exchange installed product for new replacement product as part of an ongoing improvement program.

DETAILED DESCRIPTION

Figure 1:
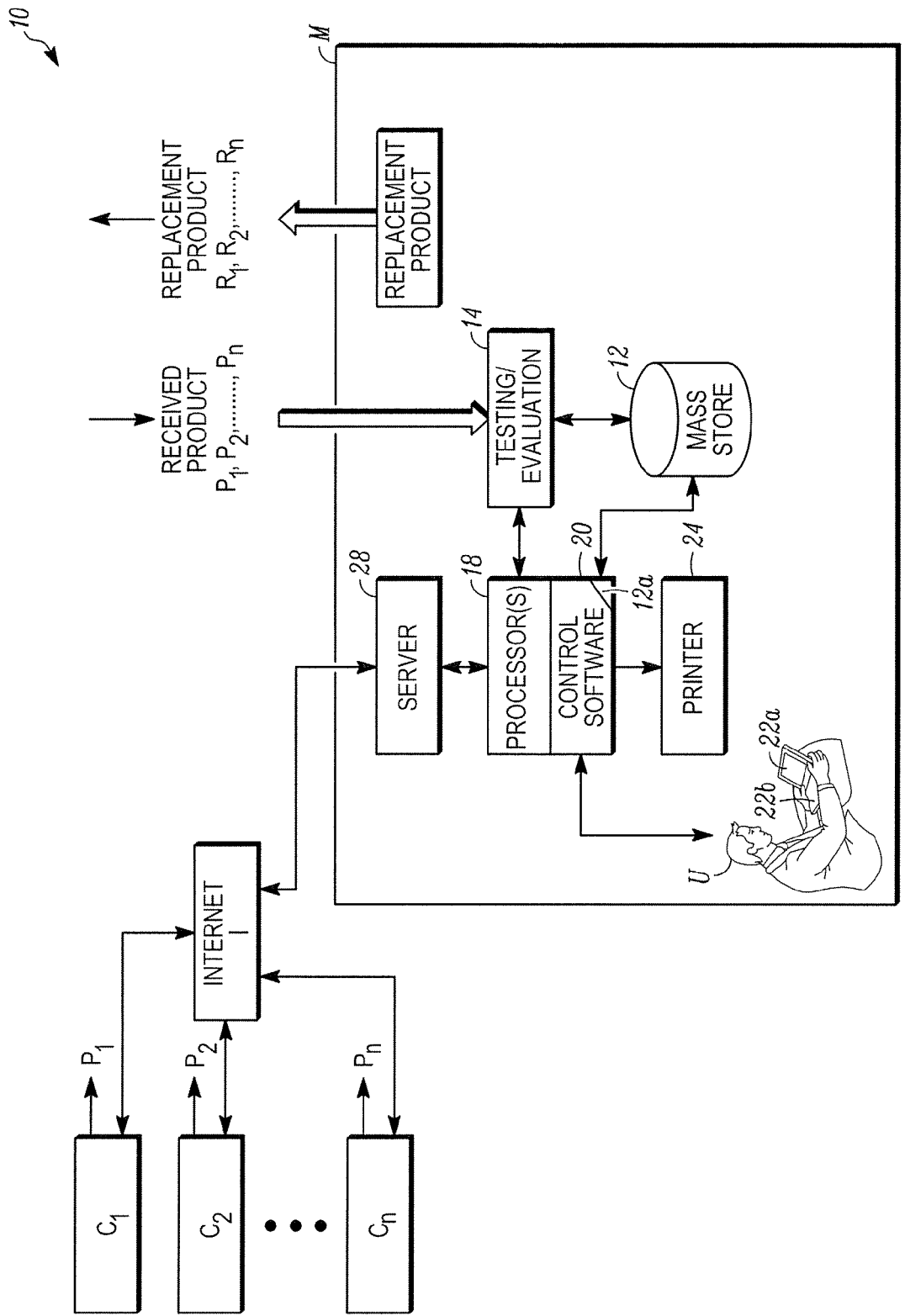
FIG. 1 illustrates a system which embodies the present invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Systems and methods which embody the present invention evaluate field installed electrical or electro-chemical units returned from various customers. The returned units can then be tested and measured to determine the relationship of their performance characteristics versus new, previously uninstalled units. Comparisons can be made between test results of product received from various customers as well as products used to implement differing applications.

In one aspect of the invention, selected samples received from one or more customers can be subject to a variety of performance indicating tests. Samples can include, for example, gas sensors, smoke sensors, other types of ambient condition sensors or electrical units all without limitation. Results can be incorporated into one or more databases. Customer feedback could be provided as to measured performance data. Results of such analysis can be communicated electronically to members of a customer group via computer network such as the Internet.

In yet another aspect of the invention, one or more customers can be asked to provide representative previously installed electrical units along with related application and installation information. Returned units can be then subject to various tests and the results thereof analyzed. Results can be incorporated into a multilevel database which can be accessible to one or more customers.

In yet another aspect of the invention, performance data pertaining to electrical units from a variety of sites or customers could be accessible at one level to a particular customer group. Selected test results, perhaps pertaining to specific customer applications, could be restricted to the relevant customer or customer group.

FIG. 1 illustrates system 10 which embodies the present invention. The system 10 enables a plurality of customers C1, C2 ... Cn to interact with a manufacturer M in developing a database, stored on a mass storage unit 12, which includes information pertaining to operational and performance characteristics of a plurality of used electrical products P received from the customers C1, C2 ... Cn for testing.

The products P would have been used by the respective customer or customers in the ordinary course of business and for the intended purpose of the respective product or products. In one embodiment of the invention, returned product P, namely P1, P2, ... Pn received from respective customers C1, C2 ... Cn would be replaced by manufacturer M with comparable replacement product R1, R2 ... Rn.

The system 10 of FIG. 1 could be facilitated by a pre-established agreement between each of the customers Ci and the manufacturer M having various terms and conditions as would be understood by those of skill in the art. Such terms and conditions are not limitations of the present invention.

The manufacturer M upon receipt of one or more of the products P carries out a testing/evaluation and analysis process 14 appropriate for the respective product or products P. For example, where the product P represents a form of ambient condition detector, such as a gas detector, testing might include testing of response of the respective detector to one or more gases, testing and evaluating sensitivity of the detector and the like all without limitation.

The evaluation and analysis processes could for example compare the performance of new detectors versus those returned from the various customer sites. All such results would then be stored in the database maintained on mass storage unit 12.

Storage unit 12 could be implemented as a magnetic-type or an optical-type storage device all without limitation. A variety of database management programs 12a are commercially available and could be used to store and access test and/or analysis results as discussed subsequently.

The manufacturer M could also incorporate one or more processors 18 and associated control software for communicating with the storage unit 12 and for participating in the testing/evaluation and analysis process 14. A graphical user's interface could be incorporated into the control software 20 for purposes of communicating visually via a display 22a and receiving information via a keyboard and/or mouse 22b from a local user U. A printer or hard copy output device 24 could be driven by the control software 20 for purposes of generating reports of the analysis results stored in the unit 12.

A local server 28, in communication with processor or processors 18 can provide a communications capability via one or more computer networks, such as the Internet I, with respect to the customer C1, C2 . . . Cn. Control software 20 and database manage software 12a can provide customer C1, C2 . . . Cn various levels of access to the data stored in the storage unit 12 which is associated with the testing/evaluation and analysis process 14.

For example, the products P might correspond to gas or smoke detectors. Tests and evaluation results obtained for a particular class of product can be made available to all of the customers C1, C2 . . . Cn as desired. Specific information pertaining to test results arising from a given customer's application can be limited to that particular customer.

Figure 2:
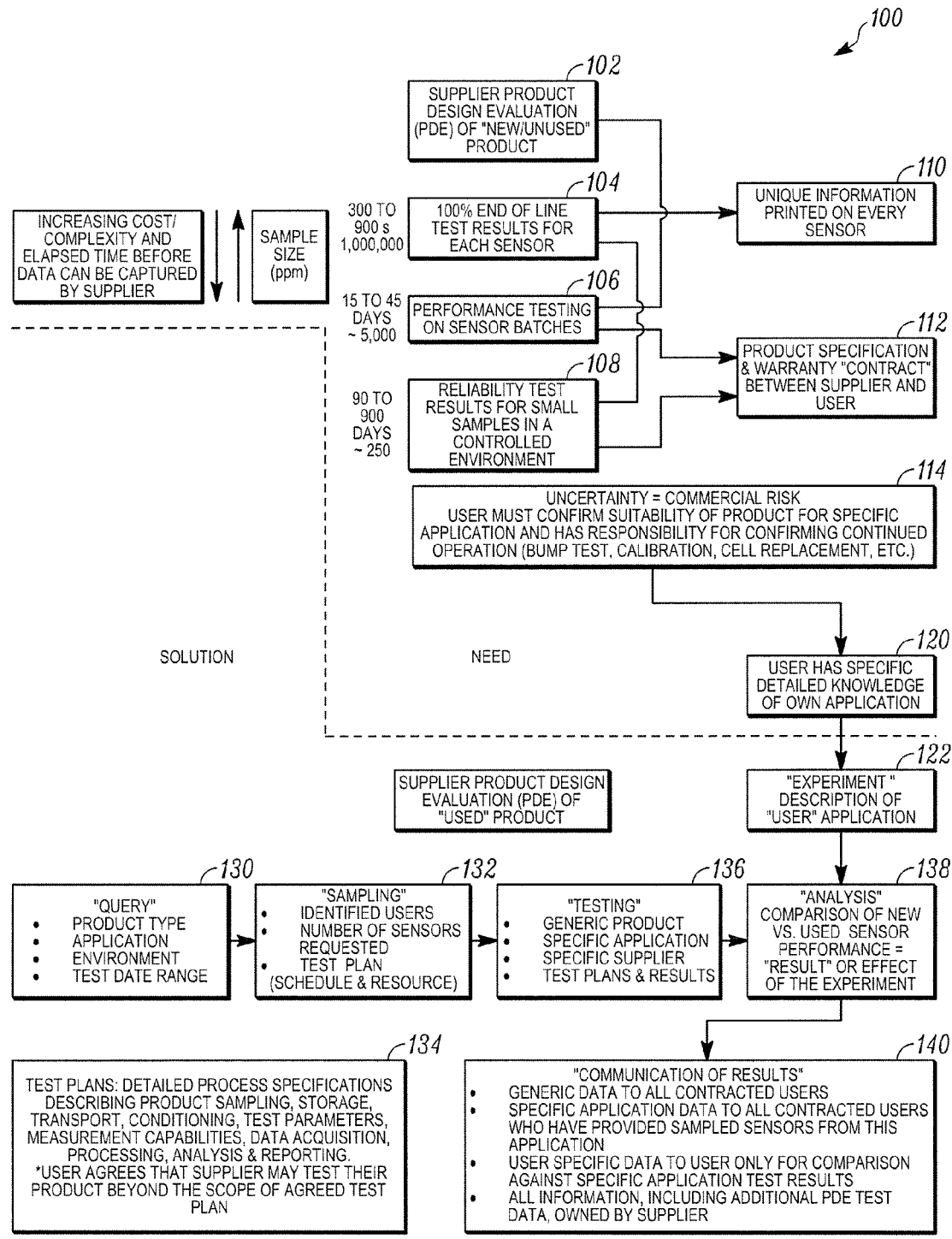
FIG. 2 illustrates a method in accordance with the invention.

FIG. 2 illustrates aspects of a process 100 which could be implemented in part with a system such as the system 10 of FIG. 1. Initially, manufacturer M can manufacture one or more products Pi and develop one or more performance tests, as at 102, for the respective products Pi. For example, one hundred percent end of line testing can be provided for each detector as at 104. Elapsed time for such testing can be on the order of three hundred to nine hundred seconds per unit.

Testing performance over a period of time, such as fifteen to forty-five days of batches of detectors can be carried out as at 106. Finally, reliability testing can be carried out for selected numbers of samples in controlled environments for extended periods of time such as ninety to nine hundred days as at 108.

Testing as at 104 can provide performance information associated with each of the detectors and be permanently marked thereon as at 110. Batch testing can provide product specification information as at 112.

The user or customer determines which product(s) are appropriate for its situation and installs, or has product installed and put into service as at 114. The product(s) Pi can then be used for their respective purpose(s) for a period of time. Such products(s) Pi can subsequently be returned, as described above to manufacturer M.

When the customer such as Ci returns respective product Pi to the manufacturer M specific detailed information pertaining to the customer's application can be provided as at 120 to the manufacturer M. Such information can be incorporated as at 122 by the manufacturer M into subsequently conducted analysis.

The user U can query the database, storage unit 12, via graphical user's interface and display 22a as to received product type, application, environment and test date ranges as at 130. Sampling processes can be carried out as at 132 in connection with identified users or customers, numbers of sensors or detectors being supplied for testing as well as development of a test plan or plans.

As at 134, one or more test plans can be developed which specify or describe product sampling, incorporate storage transportation, conditioning test parameters, measurement capabilities and other related information. The manufacturer M can carry out testing as at 136 of the returned product or products of a generic nature across a class of product such as a class of detectors or associated with specific applications or specific customers or customer specific test plans. Results can be analyzed as at 138 taking into account the respective customer's application as at 122.

Finally, testing and/or analysis results can be communicated on a multilevel basis to all of the members of a particular group C1, C2 . . . Ci related to generic results associated with the class of detectors. Alternately, at another, more limited access level, customers associated with a specific application data can be provided access to related test results.

Those of skill in the art will understand that variations on the process 100 which relate to specific details associated with testing various types of detectors, associated analysis and the like are not limitations of the present invention. Further, neither the type of electrical or electro-chemical unit being used, return and analyzed nor the customer types or product usage environments are limitations of the invention. All such variations come within the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:

a customer of a manufacturer using a product provided by a manufacturer in the ordinary course of business of the customer and for the intended purpose of the product through at least a portion of the product's lifetime;

selecting at least one type of the used product for evaluation, the selected product having been provided to the customer by the manufacturer and wherein the used product selected for evaluation is not defective or non-performing;

physically removing a plurality of the selected products from respective installed locations of the customer of the manufacturer;

collecting the plurality of products at a predetermined location of the manufacturer;

the manufacturer physically sending comparable replacement products to the customer to replace the plurality of removed products;

establishing a test plan for members of the plurality;

conducting tests of the members of the plurality in accordance with the plan;

conducting an analysis of the test results, including comparing test results with test results of unused product of the same type provided by the manufacturer;

providing a mass storage device; and storing results of the testing and analysis in the storage device.

2. A method as in claim 1 which includes providing a hard copy of selected results of the analysis.

3. A method as in claim 1 which includes visually displaying at least one of test or analysis results.

4. A method as in claim 1 which includes supplying replacements for the members of the collected plurality.

5. A method as in claim 1 which includes establishing a multi-level access process relative to results stored in the storage device.

6. A method as in claim 5 where the access process includes communicating with a plurality of displaced locations via a computer network.

7. A method as in claim 6 where the access process includes receiving inquiries from at least one of the locations relative to at least one of stored test results or stored analysis results.

8. A method as in claim 7 which includes: responding to an inquiry in accordance with one of at least two access levels where one level provides access to a first extent of stored information, and another level provides access to a second, different extent of stored information.

9. A method as in claim 8 where the another level is more restricted than the one level.

10. A method as in claim 9 where the second extent of stored information relates to a predetermined installed location.

11. A system comprising:
product provided by a manufacturer and used by a customer in the ordinary course of business of the customer for the intended purpose of the product wherein the provided product has been used by the customer through at least a portion of the product's lifetime and the used product is not defective or nonperforming;
a test facility of a manufacturer to test used product of the manufacturer physically returned from a field installation of a customer;
replacement product physically returned to the customer to replace the returned product;
an analyzer to receive test results relative to at least one class of returned product and to generate outputs indicative of a predetermined analysis process;
a storage apparatus which can store, for subsequent retrieval, test results and analyze outputs;
a communications interface, coupled to the storage apparatus, which can receive at least one query from a displaced source of the customer seeking to obtain selected results and outputs of the used product returned by the customer and where the selected results and outputs are restricted to the tested used product returned by the customer.

12. A system as in claim 11 where the interface includes circuitry to obtain access authorizing indicia, associated with the source.

13. A system as in claim 12 where the interface limits access to stored information in accordance with the authorizing indicia.

14. A system as in claim 12 where the interface includes at least one programmable processor and associated control software to communicate with the displaced source via a computer network.

15. A system as in claim 12 which includes a graphical user's interface coupled to the communications interface.

16. A system as in claim 11 which includes a shipment facility to return replacement, unused product to the field installation as replacement for the received product.

17. A system as in claim 11 where the test facility tests both application independent and application specific device characteristics.

18. A system as in claim 17 where application independent characteristics are tested for product returned from a plurality of different field installations.

19. A system as in claim 11 where the analyzer is responsive to application specific information.

20. A system as in claim 11 where the used product is selected from a class which includes at least gas detectors, smoke detectors, electro-chemical units, or electrical units.

* * * * *